May 13, 1952

H. E. GOLDSTINE 2,596,479

HEAT RADIATOR AND ANTENNA

Filed Jan. 21, 1949

2 SHEETS—SHEET 1

INVENTOR
Hallan E. Goldstine
BY
Harry Tunick
ATTORNEY

May 13, 1952 H. E. GOLDSTINE 2,596,479

HEAT RADIATOR AND ANTENNA

Filed Jan. 21, 1949 2 SHEETS—SHEET 2

INVENTOR
Hallan E. Goldstine
BY Harry Tunick
ATTORNEY

Patented May 13, 1952 2,596,479

UNITED STATES PATENT OFFICE 2,596,479

HEAT RADIATOR AND ANTENNA

Hallan E. Goldstine, Port Jefferson Station, N. Y., assignor to Radio Corporation of America, a corporation of Delaware Application January 21, 1949, Serial No. 71,773

7 Claims. (Cl. 250—33)

This invention relates to a new and useful device for receiving radiant energy including both radiant solar energy and radio frequency energy.

A purpose of this invention is to provide a means for supplying radiant heat from solar radiation into a room and to receive radio frequency signals.

With the advent of television and frequency modulation there is an increasing need for an efficient type of antenna which can be located indoors and can also be employed to help reduce the fuel cost of heating a home by absorbing solar heat radiation. The invention accomplishes this result by having a metallic antenna structure also serve as a heat radiator of radiant energy. Thus the device of this invention will have further utility and be more desirable for use in the home. The device of this invention is particularly advantageous in an apartment house where it is rather difficult to provide antennas and also where the apartments are at an elevation sufficiently high to provide a good radio signal as is required for efficient reception of television and frequency modulation systems.

An object of this invention is to provide a box like device with open ends which serves the dual purpose of distributing radiant heat energy into a room from solar radiation and also acts as a receiving radio antenna for radio signals particularly those in the television and frequency modulation broadcasting bands.

Another object of this invention is to provide a novel metallic home utility device which is divided into two parts with means connecting each part to radio frequency apparatus within the home.

A feature of this invention is the novel arrangement of a radiator valance which is slit in the middle and provided with a low-loss insulating material therein, such as polyethylene, which material is used as a mechanical spacer so that the two halves of the valance are insulatingly and electrically separated in such manner they may serve as a dipole type of television or frequency modulation broad band antenna.

This invention will best be understood by referring to the accompanying drawings in which.

Figure 1:
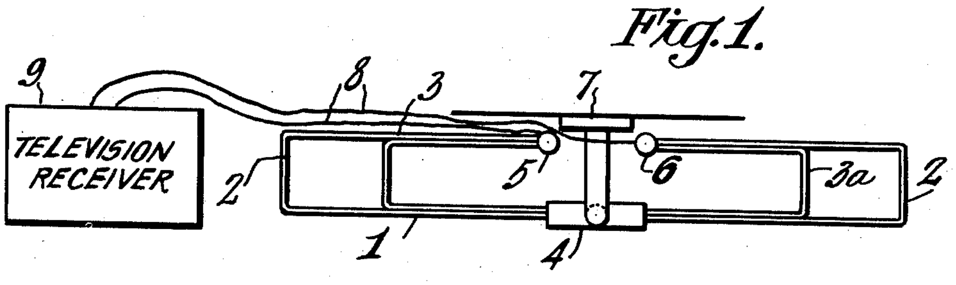
Fig. 1 is a plan view of one device of this invention.
Figures 2, 3, 6:
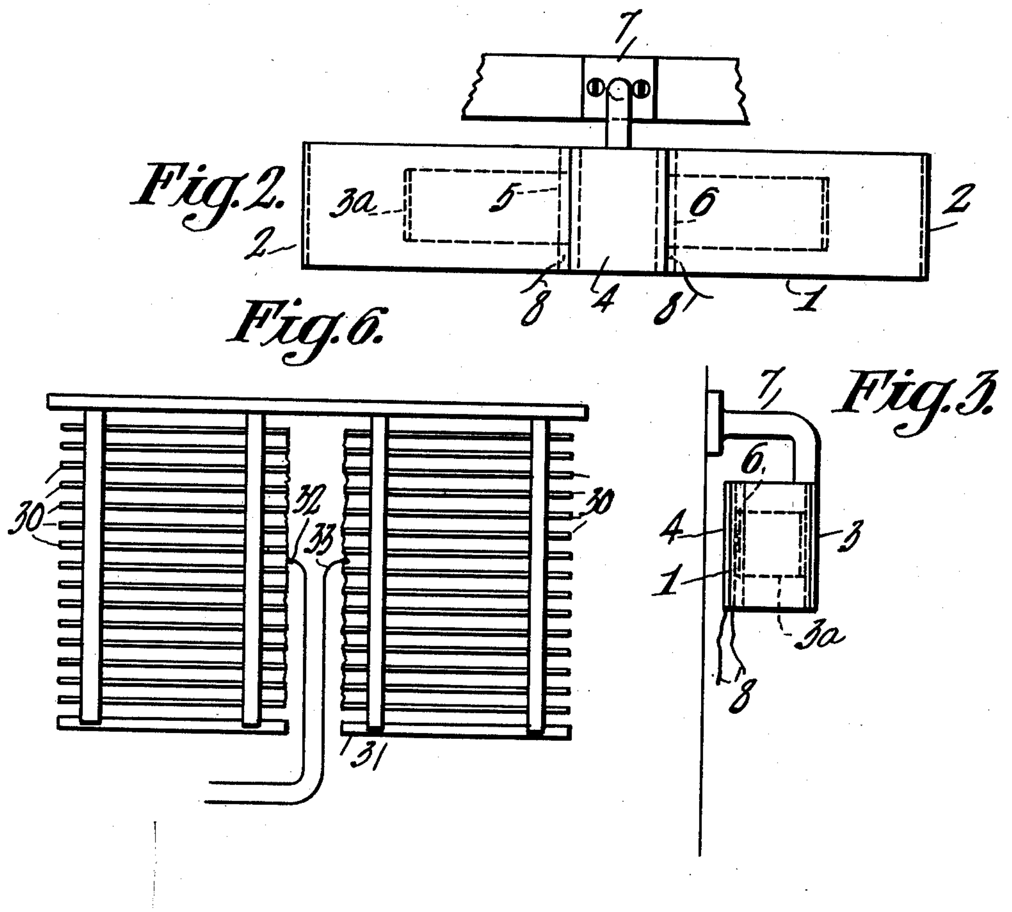
Fig. 2 is a front elevation of the device of Fig. 1.
Fig. 3 is a side elevation of the device of Figs. 1 and 2.
Fig. 6 is a front elevation of a modification of this invention wherein a metallic Venetian blind is arranged to serve as an antenna.

Referring now in detail to Figs. 1, 2, and 3 of the drawing, there is shown a metallic valance 1 which is 24″ to 36″ long, and 10″ wide, and which is made of light weight metal such as aluminum. This valance is positioned in the interior of a building adjacent the window, and is bent at 2 and spaced out approximately 4″ from the wall of a building and has two back or securing portions 3 extending to form a space or open ended box structure which is approximately 2″ long at the back portion thereof. A metal strap 3*a* shown by the dotted lines, may be added to make contact between the front and rear portions of metal member 1, in order to adjust for frequency. The front portion of member 1 may be divided in the center by a block 4 of a low-loss insulation material. If a folded dipole type of antenna is used block 4 should be omitted and replaced by a metallic conductor in which case the entire arrangement would be metal. This arrangement of such a metallic valance is that of a dipole antenna. Adjacent each side of the insulating block 4 are terminals 5 and 6 which are of any suitable form such as electrical binding post or other suitable connection means such as nuts and bolts. The metallic member 1 is supported at the upper portion thereof by a metallic support bracket 7 arranged to space the heat radiator and antenna a desired distance from the upper portion of a window frame. Conducting strips may be placed from the mounting brackets of the valance on the window side to provide a folded dipole type of antenna. A low impedance transmission line 8 connects the heat radiator and antenna structure of this invention to radio apparatus indicated generally by the block 9. The valance 1 is preferably painted on the side facing a window with a type of paint which will absorb the heat radiant energy from the sun. A suitable color for the paint is dull black. The room side of the valance may be painted with a color which will be pleasing to the decorative scheme of the room or it may be painted with any suitable design in keeping with the architectural finish. In this type of heat radiator and antenna, the valance which is approximately 10 inches wide serves as a heat duct which will provide a chimney effect for increasing the convection of warm air in the room. At the same time by having the transmission line 8 connected to radio apparatus from the terminals 5 and 6, an efficient type of television antenna is provided.

Figure 4:
Fig. 4 is a plan view of a further modification of this invention.
Figure 5:
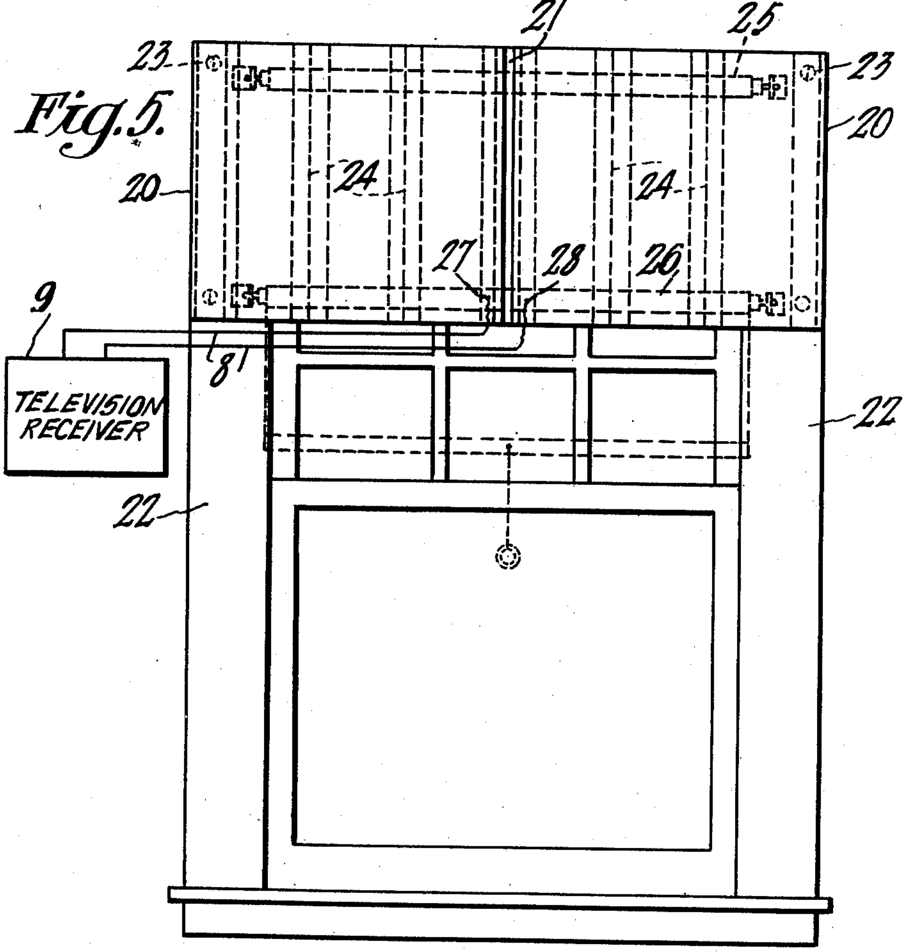
Fig. 5 is a front elevation of Fig. 4.

The modification shown in Figs. 4 and 5 of the drawing includes a metallic valance 20 having a central insulating portion 21. The valance 20 is secured to the inside frame 22 of a window by means of supporting bolts 23. The inner surface of valance 20 is provided with 6 semi-circular duct members 24 and having three semi-circular members located each side of the insulating member 21. The semi-circular members 24 serve as ducts which will provide a chimney effect for increasing the convection of warm air in the room. A light colored roller window shade 25 possibly of a type having a reflecting surface facing toward the window is mounted near the top of the valance so that it may be drawn down to prevent the heat from entering the room during the summer months or at any other time when it is desired not to supply the extra radiant heat. A lower roller shade 26 is mounted at the bottom of the radiator valance for adjusting the light entering the room through the window. This device should preferably be located on the south or sun exposed windows so as to obtain the full benefit of solar radiations. Electrical connections are made from binding posts 27 and 28 to radio apparatus 9 by means of a transmission line 8.

The Venetian blind type of antenna shown by Fig. 6 is a metallic blind 30 in which a central insulation member 31 is provided with certain of the slats which are of suitable metal of high conductivity. The central ends of the metallic slats 30 are provided with flexible wires and terminals 32 and 33 for making connection to any suitable type of radio apparatus. The outer ends of the metallic slats 30 may be folded back if it is desired to obtain additional length for an antenna to receive certain frequencies. The metallic slats also aid in heating the room.

What I claim as my invention is:

1. A metallic home utility device comprising a metallic valance having a plurality of open ended ducts made of sheet-like material and located in the rear portion thereof, means for securing said metallic valance to the inside of a building adjacent a window therein, means to insulatingly divide said metallic valance into halves, a frequency adjusting metallic strap in each half of said metallic valance, and means for making electrical connection from each half of said metallic valance to radio frequency apparatus.

2. A metallic home utility device for providing a means for supplying radiant energy into a room from solar radiation entering a light permeable portion in the room and for receiving energy from radio frequency signals, said means comprising a Venetian blind having a plurality of horizontally extending metallic slats, and an insulating member dividing the metallic slats of said blind into symmetrically positioned halves, said halves constituting the dipole arms of an antenna.

3. A metallic home utility device comprising a metallic valance in the form of a sheet of material arranged in a vertical plane and extending horizontally, said sheet being folded back at its ends to form incomplete loops open at top and bottom, means for securing said metallic valance to a building adjacent a window therein, a pair of adjustable metallic straps located within each of said incomplete loops, and means for making electrical connection from said incomplete loops, said means including a low impedance line which connects the valance to radio frequency apparatus located within the building.

4. A combination antenna and solar energy receiving device, comprising a metallic sheet positioned inside the room of a building adjacent a window, said metallic sheet being arranged in a vertical plane and extending across the width of said window said sheet having the ends thereof folded back to lie adjacent each other and being effectively divided at its center into two halves, adjustable strap members arranged in said halves and means for respectively securing said halves to the frame of the window.

5. An antenna structure comprising a metallic sheet positioned inside a room of a building adjacent a window, said metallic sheet being arranged in a vertical plane and extending across the width of the window, said sheet having the ends thereof folded back to lie adjacent each other, adjustable short circuiting strap members arranged in the folds of said sheet, means to connect radio frequency apparatus to said sheet at said adjacent ends, and means at the center of said sheet for supporting said antenna structure to the frame of said window.

6. An antenna structure comprising a Venetian blind having a plurality of horizontally extending metallic slats, each of said slats being divided by an insulating member into two electrically separate portions, flexible conductive means electrically interconnecting all of the slats of corresponding portions together, and means to couple radio frequency apparatus between the electrically interconnected portions of said blind.

7. A combination radio frequency and solar energy translating device, including a conductive surface structure arranged adjacent to a portion of a building permeable to radio frequency and solar radiation, said structure comprising two substantially coplanar members electrically separated from each other along a vertically disposed line substantially at the center of said structure, means to couple radio frequency apparatus to said members across said vertically disposed separating line, and a plurality of channel members arranged on each of said coplanar members to form a plurality of open-ended ducts having vertically disposed axes.

HALLAN E. GOLDSTINE.

REFERENCES CITED

The following references are of record in the file of this patent:

UNITED STATES PATENTS

| Number | Name | Date |
|---|---|---|
| 1,696,402 | Horton | Dec. 25, 1928 |
| 1,845,512 | Neil | Feb. 16, 1932 |
| 1,960,006 | Hagen | May 22, 1934 |
| 2,240,298 | Heindel | Apr. 25, 1941 |
| 2,283,914 | Carter | May 26, 1942 |
| 2,369,556 | Gamet | Feb. 13, 1945 |
| 2,433,183 | Wolf | Dec. 23, 1947 |
| 2,440,597 | Atwood | Apr. 27, 1948 |
| 2,480,153 | Masters | Aug. 30, 1949 |